(12) United States Patent
Cui et al.

(10) Patent No.: US 7,079,828 B1
(45) Date of Patent: Jul. 18, 2006

(54) METHOD AND APPARATUS FOR SIDE-LOBE CANCELLATION IN WIDEBAND RADIO SYSTEMS

(75) Inventors: Jian Cui, Acton, MA (US); Manish Bhardwaj, Acton, MA (US)

(73) Assignee: Edgewater Computer Systems, Inc., Ottawa (CA)

( * ) Notice: Subject to any disclaimer, the term of this patent is extended or adjusted under 35 U.S.C. 154(b) by 375 days.

(21) Appl. No.: 10/375,306

(22) Filed: Feb. 27, 2003

Related U.S. Application Data

(60) Provisional application No. 60/421,298, filed on Oct. 25, 2002.

(51) Int. Cl.
*H04B 1/06* (2006.01)

(52) U.S. Cl. .............. 455/278.1; 455/296; 455/63.1; 375/324; 375/346

(58) Field of Classification Search ........... 455/146, 455/561, 562.1, 272, 277.2, 278.1, 303, 306, 455/132, 134, 135, 550.1, 570, 575.1, 425, 455/424, 456.5, 456.6, 63.1, 67.11, 114.2, 455/161.3, 296, 295; 375/130, 211, 219, 375/232, 233, 346, 229; 370/342, 310, 347, 370/23, 29.7, 209, 210, 437, 324, 348, 260, 370/340
See application file for complete search history.

(56) References Cited

U.S. PATENT DOCUMENTS

| 5,218,619 | A | * | 6/1993 | Dent ........................ 370/209 |
| 5,323,391 | A | * | 6/1994 | Harrison ..................... 370/210 |
| 5,537,435 | A | * | 7/1996 | Carney et al. ............... 375/219 |
| 6,363,262 | B1 | * | 3/2002 | McNicol ..................... 455/561 |
| 6,745,050 | B1 | * | 6/2004 | Forsythe et al. ............ 455/561 |
| 6,760,342 | B1 | * | 7/2004 | Skones et al. ............... 370/437 |
| 6,876,645 | B1 | * | 4/2005 | Guey et al. .................. 370/342 |
| 2001/0033614 | A1 | * | 10/2001 | Hudson ..................... 375/229 |
| 2002/0196876 | A1 | * | 12/2002 | Takada ....................... 375/346 |
| 2003/0072291 | A1 | * | 4/2003 | Brunel ....................... 370/342 |

\* cited by examiner

*Primary Examiner*—Edward F. Urban
*Assistant Examiner*—Charles Chow
(74) *Attorney, Agent, or Firm*—Daly, Crowley, Mofford & Durkee, LLP

(57) ABSTRACT

In a multi-user radio receiver, a method and apparatus for reducing the effects of non-linear distortion due to adjacent channel interference (ACI) includes receiving and processing a multi-user information signal to provide a plurality of multi-user information values and then detecting, from the plurality of multi-user information values, at least a first information value having a signal strength which is relatively high compared with the signal strengths of the other plurality of multi-user information values. The apparatus then utilizes the plurality of multi-user information values, the first information value and a spectral representation of the first information value to generate a plurality of second information values having significantly reduced adjacent channel interference with respect to the first information value. The method and apparatus can thus increase the system capacity by increasing the frequency reuse factor in the a receiver system (e.g. a wideband receiver system) for wireless LAN applications.

19 Claims, 5 Drawing Sheets

METHOD AND APPARATUS FOR SIDE-LOBE CANCELLATION IN WIDEBAND RADIO SYSTEMS

CROSS-REFERENCE TO RELATED APPLICATION

This Application claims the benefit under 35 U.S.C. §119(e) of U.S. Provisional Application Ser. No. 60/421,298 filed Oct. 25, 2002.

BACKGROUND OF THE INVENTION

For radio communication, the non-linearity of a power amplifier included in a transceiver is one of the dominate impairments in wireless systems. Due to the nature of the dynamic range of transmit and receive radio signals, it is sometimes necessary to back-off or reduce gain in a transmit or receive signal path in order to reduce the signal distortion. Such gain reduction can have significant impact on system performance and power efficiency.

Recently, Orthogonal Frequency Division Multiplexing (OFDM), which is one standard multi-carrier modulation scheme, has been used in IEEE802.11.a, Hiperland/2. One advantage in selecting the OFDM as the standard modulation scheme is realized by the capability to combat frequency selective fading, its spectrum efficiency and its low implementation complexity. However, one significant drawback of OFDM is its vulnerability to non-linear distortion due high peak to average ratio (PAR). Tremendous effort has been made to reduce the impact of non-linearity in radio receivers, which is caused by amplifiers included in transceivers of the radio receiver.

In a communication system, it is assumed that there is one wideband receiver and two users. Further, it is assumed that each of the two users are associated with a spectrum and that each spectrum associated with each of the two users are defined adjacent to each other. The signal received at the receiver due to the non-linear distortion is represented by:

$$y(n)=f_1(h_1(n)*s_1(n))+f_2(h_2(n)*s_2(n))+v(n) \quad (1)$$

where, $h_1(n)$ and $h_2(n)$ are the channel impulse response of two users without non-linear distortion, s1(n) and s2(n) are the modulated signals, $f_1(x)$ and $f_2(x)$ are the non-linear functions, and v(n) is the background noise.

There are two non-linear functions, which are widely used in the applications:

1. RappPa model:

$$d(x) = (1 + |x|^{2p})^{\frac{1}{2p}}$$

$$y(x) = \frac{x}{d(x)}$$

2. Polynomial model:

$$y(x)=a_1x+a_3x^3$$

The impact of non-linear distortion on the signal spectrum is shown in FIG. 1, where in the RappPa model, p=2. In this case, the users wouldn't interfere with each other, since the signal powers of two users at the receiver are comparable. The SNR is large enough and any small leakage from an adjacent channel wouldn't cause any performance degradation.

As illustrated in FIG. 1, the adjacent interference is about 25 dB below the signal level. Further, the ACI has no impact on the performance of user 1 and user 2.

In typical application environments, however, different channel fading experienced by individual users and different distances of each user from the receiver can adversely affect the non-linear distortion on the signal spectrum, which is exemplified in FIG. 2. In FIG. 2, the receiver powers are not comparable in that the received power of user 2 has about 15 dB higher than that of user 1. In this case, the Adjacent Channel Interference (ACI) caused by user 2 may start to interfere with the signal associated user 1 at level of about 10 dB. This interference between the signals associated with user 1 and user 2 can undesirably cause Bit-Error-Rate ("BER") performance degradation.

Non-linear distortion due to the non-linear amplifier located in the radio transmitter and receiver, as well as the high peak-to-average-power-ratio modulation, may cause the reduction of signal power in the in-band channel(s). The reduction of signal power in the in-band channel(s) may further increase the interference level in the out-of-band adjacent channel(s). This ACI is also called the side-lobe of the in-band signal, which can lead to severe performance degradation if the power level of the adjacent user is comparable to the power level of the ACI.

It would, therefore, be desirable to provide a method and apparatus for combatting non-linear distortion.

SUMMARY OF THE INVENTION

The invention proposed here is to find a simple way to reduce the impact of ACI due to the non-linear distortion in the communication system. More specifically, a system and method is proposed to combat the non-linear distortion in a multi-user wideband radio receiver. The receiver can capture, process and demodulate a multi-user information signal to detect a signal associated with a stronger user. After demodulating the signal from the stronger user, the input signal of the stronger user is reconstructed based on the decision made. The effect of the non-linear distortion caused by the signal associated with the stronger user can be compensated by subtracting the reconstructed signal from the input signal. This technique can greatly increase the system capacity by increasing the frequency reuse factor in the multi-user wideband receiver system for wireless local area network (LAN) applications.

In one aspect, the multi-user wideband radio receiver includes an interface adapted to receive and process a multi-user information signal to provide a plurality of multi-user information values having a plurality of predetermined content associated with a plurality of users of the multi-user wideband radio receiver. The receiver includes a first channel of a plurality of channels, which is coupled to the interface. The first channel is adapted to receive and process the plurality of multi-user information values to detect at least a first information value having a relatively high signal strength. The first information value includes first predetermined content of the plurality of predetermined content and is associated with a first user of the plurality of users of the multi-channel wideband radio receiver.

The receiver further includes a signal processing portion, which is coupled to the interface and to the first channel. The signal processing portion is adapted to receive and process the plurality of multi-user information values, the first information value and a spectral representation of the first information value to generate a plurality of second information values. The plurality of second information values include significantly reduced adjacent channel interference with respect to the first information value.

In one aspect, the interface includes an antenna adapted to capture an information signal. The interface further includes an amplifier having an input coupled to receive the information signal from the antenna and an output adapted to provide an amplified version of the information signal. The interface also includes a converter circuit having a first input coupled to receive the amplified version of the information signal from the amplifier and a second input adapted to receive a reference signal. The converter circuit processes the amplified version of the information signal and the reference signal to provide an intermediate frequency signal at an output of the converter circuit. The interface also includes an analog-to-digital converter (ADC) having an input and an output. The input of the ADC is coupled to the output of the converter circuit and the output is coupled to the first channel portion as well as to the signal processing portion. The ADC is adapted to provide the plurality of multi-user information values at the output thereof.

In one aspect, the first channel includes a first filter having an input coupled to the output of the ADC and an output adapted to provide at least the first information value having the relatively high signal strength. The first channel further includes a demodulation circuit having an input coupled to the output of the first filter and an output adapted to provide the spectral representation of the first information value. The demodulation circuit can include a number of algorithms for processing the first information value having the relatively high signal strength, such as a Fast Fourier Transform (FFT) algorithm.

In one aspect, the signal processing portion includes a modulation circuit having an input adapted to receive the spectral representation of the first information value from the first channel and an output to provide a reconstructed version of the first information value. The signal processing portion further includes an estimated channel impulse response circuit having an input coupled to receive the first information value from the first channel and an output adapted to provide a plurality of estimated coefficient values.

In addition, the signal processing portion includes a functional block circuit having a first input coupled to the output of the estimated channel impulse response circuit to receive the plurality of estimated coefficient values. The functional block circuit further includes a second input coupled to the output of the modulation circuit to receive the reconstructed version of the first information value. The functional block circuit is operative to process the plurality of estimated coefficient values and the reconstructed version of the first information value to provide nonlinear component user information values at an output of the functional block circuit.

The signal processing portion further includes a subtraction circuit having a first input adapted to receive the plurality of multi-user information values from the first channel and a second input adapted to receive the nonlinear component user information values from the functional block. The subtraction circuit is operative to subtract the nonlinear component user information values from the plurality of multi-user information values to provide the plurality of second information values at an output of the subtraction circuit.

The multi-channel wideband radio receiver further including a second channel of the plurality of channels. The second channel is adapted to receive and process the plurality of second information values to provide at least a second information value having a second predetermined content of the plurality of predetermined content, which is associated with a second user of the plurality of users of the multi-channel wideband radio receiver.

The second channel includes a second filter having an input coupled to the output of the subtraction circuit to receive the plurality of second information values from the signal processing portion. The second filter further includes an output adapted to provide the second information value. The second channel further includes a demodulation circuit having an input coupled to the output of the filter to receive the second information value and an output to provide a spectral representation of the second information value.

DESCRIPTION OF THE PREFERRED EMBODIMENTS

Before proceeding with the description, it should be noted that in the description hereinbelow, it is assumed that the non-linear distortion has little or small impact on the signal detection for an in-band user. It is also assumed that the receiver can detect which user has the strongest signal in the multi-user environment.

Figure 1:
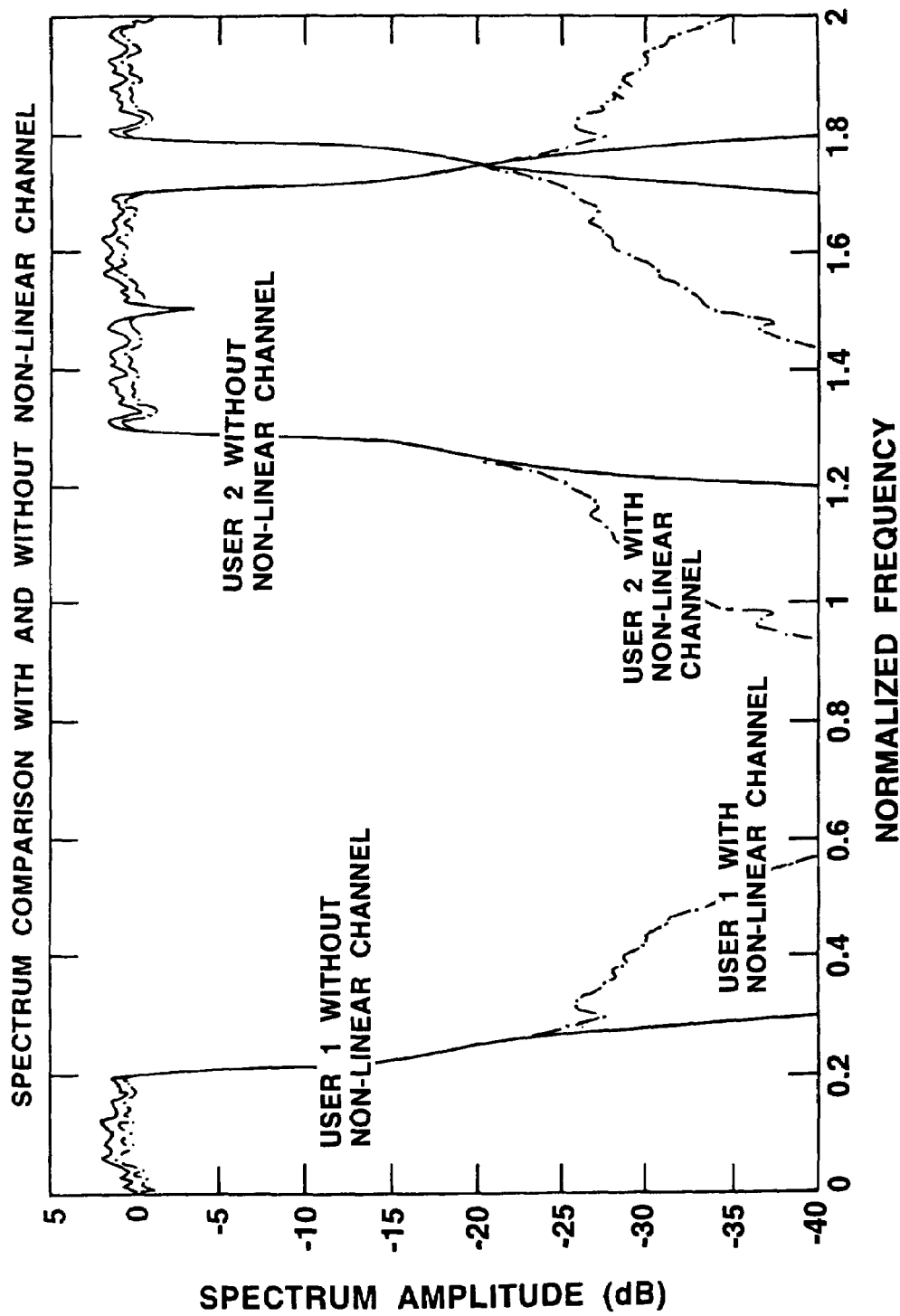
FIG. 1 is a plot of the impact of non-linear distortion on signal spectrum with users who have the comparable signal level at a prior art receiver.
Figure 2:
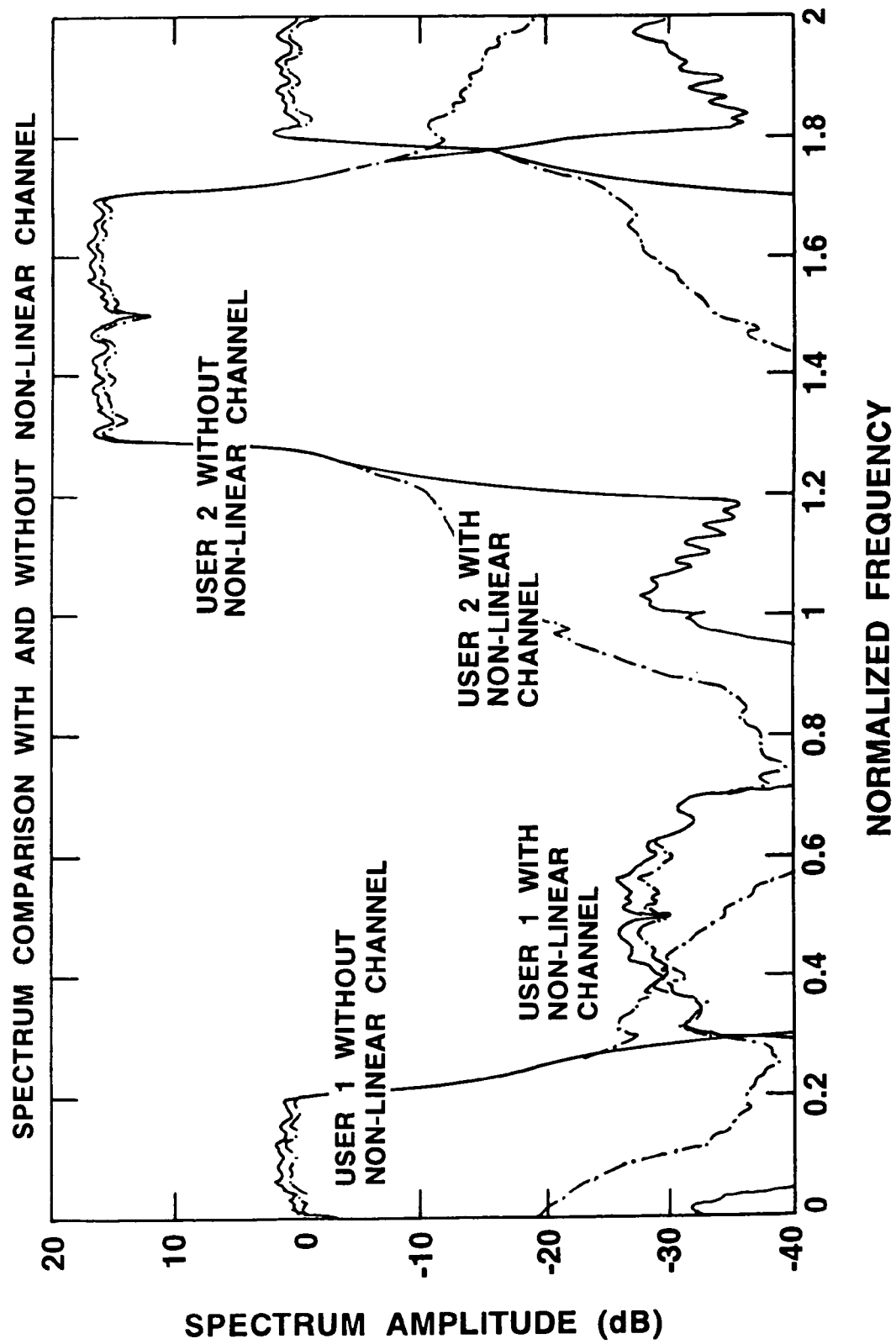
FIG. 2 is a plot of the impact of non-linear distortion on signal spectrum with users who have different power level in the prior art receiver.
Figure 3:
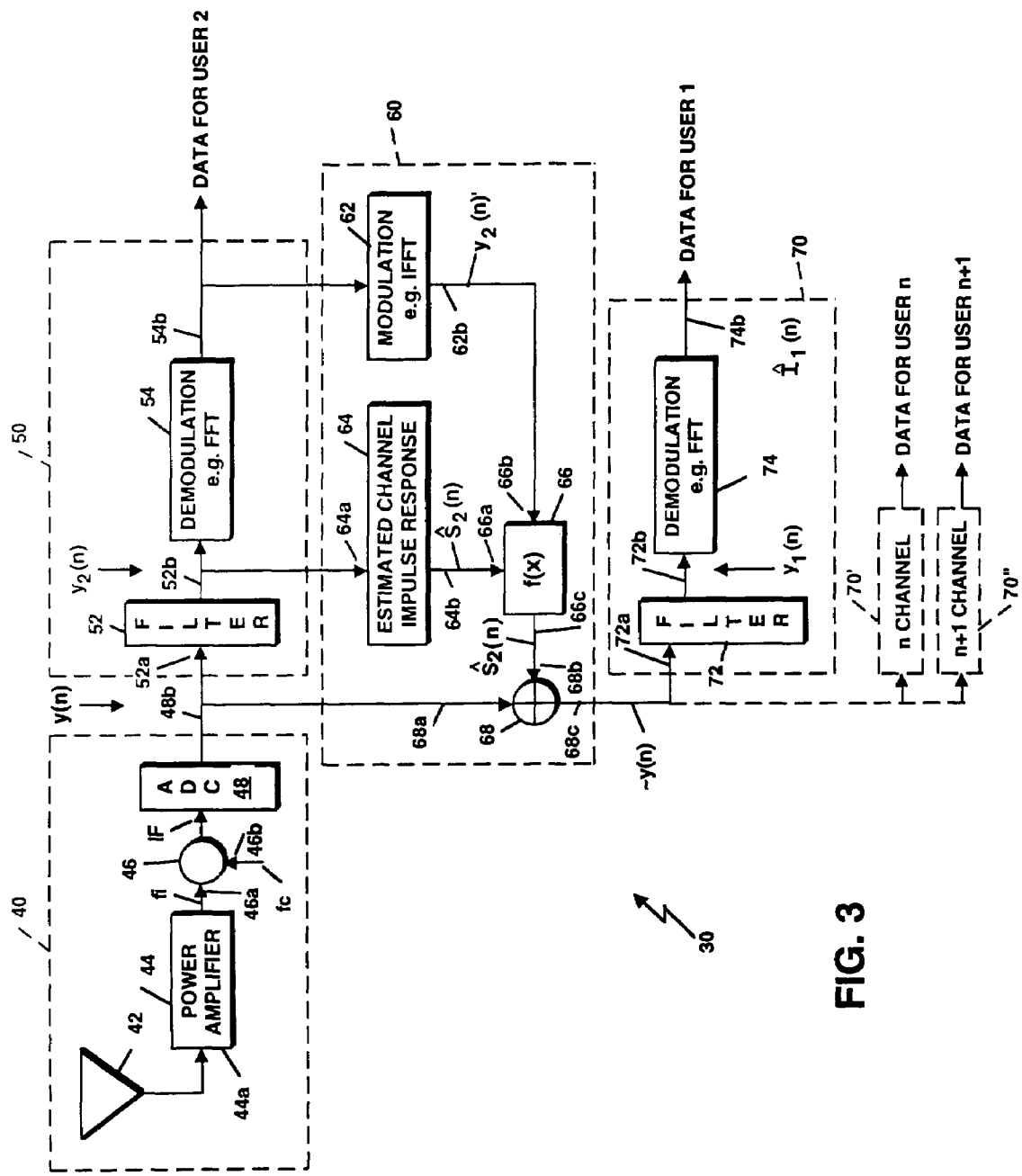
FIG. 3 is a block diagram of a wideband radio receiver in the case of two users.

Referring now to FIG. 3, the wideband radio receiver 30 includes an interface portion 40, a first channel portion 50, a signal processing portion 60 and a second channel portion 70. In the exemplary embodiment, the interface portion 40 is coupled to the first channel portion 50 and to the signal processing portion 60. A filtered portion (e.g. $y_2(n)$) and an unfiltered portion (e.g. y(n)) of the input to the first channel portion 50 are coupled to the signal processing section 60. Further, an output (e.g. $I_2(n)$) of the first channel portion 50 is coupled to the signal processing portion 60. The signal processing portion 60 is coupled to the second channel portion 70. Although the wideband radio receiver is depicted as including the first 50 and second 70 channel portions, it should be understood that the wideband radio receive 30 can be scaled to include additional channel portions, such as channels 70' and 70".

In one embodiment, the interface portion 40 includes an antenna 42 that captures and provides an analog information signal to an input 44a of a power amplifier 44. The power amplifier 44 is operative to amplify the analog information signal and to provide the amplified analog information signal (fi) to a first input 46a of a converter circuit 46 (e.g. mixer). The converter circuit 46 further includes a second input 46b adapted to receive a reference signal (fc), which is generated by a reference signal source (not shown). The converter circuit 46 combines the fc signal and the fi signal to generate an intermediate frequency ("IF") output signal. The IF signal is provided to an input 48a of an analog-to-digital converter circuit (ADC) 48. The ADC 48 processes the IF signal to generate a plurality of digital values representing multiple user information values y(n) having predetermined content related to a number of users of the wideband radio receiver 30.

The first channel portion 50 includes a first filter circuit 52 having an input 52a and an output 52b. The input 52a of the first filter circuit 52 is coupled to an output 48b of the ADC 48, which is located on the interface portion 40. The first filter circuit 52 is adapted to receive and filter the user information values y(n) to generate a filtered first set of user information values $y_2(n)$ at the output 52b of the first filter circuit 52. The first set of user information values $y_2(n)$ each further include relatively stronger signal amplitudes than other components of the user information signal y(n). Furthermore, the first set of user information values $y_2(n)$ includes the dominate non-linear components of the user information values y(n) which are received by one user of the wideband radio receiver 30 (e.g. information received by a second user coupled to an output of the first channel portion 50).

The first channel portion 50 further includes a demodulation circuit 54 having an input coupled to the output 52b of the first filter circuit 52. The demodulation circuit 54 is adapted to receive the first set of user information values $y_2(n)$ generated by the filter 52, as described above, and to process the first set of user information values $y_2(n)$ to generate a spectral representation of the user information values, which is referred to as $I_2(n)$ in FIG. 3. The spectral representation of the user information values $I_2(n)$ is provided to a predetermined user (e.g. second user) of the wideband radio receiver 30, via an output 54b, of the demodulation circuit 54. The output 54b of the demodulation circuit 54 also defines the output of the first channel portion 50. In the exemplary embodiment, the demodulation circuit 54 includes a Fast Fourier Transform ("FFT") processor that is operative to demodulate the first set of user information values $y_2(n)$ received at the input of the demodulation circuit and to provide the spectral representation $I_2(n)$ of the first set of user information values $y_2(n)$ at the output 54b of the demodulation circuit 54.

The signal processing portion 60 includes a modulation circuit 62 that receives and processes the spectral representation of the user information values $I_2(n)$, which is provided at the output 54b of the demodulation circuit 54 or output of the first channel portion 50. In the exemplary embodiment, the modulation circuit 62 includes an Inverse FFT (IFFT) that is operative to generate a reconstructed version of the first set of user information values $y_2(n)'$. The signal processing portion 60 further includes an estimated channel impulse response circuit 64, which includes an input 64a and an output 64b. The input 64b of the estimated channel impulse response circuit 64 is coupled to the first channel portion 50 and is adapted to receive the first set of user information values $y_2(n)$ from the first channel portion 50. The estimated channel impulse response circuit 64 processes the first set of user information values $y_2(n)$ to generate a plurality of estimated parameter or coefficient values $\hat{S}_2(n)$, which are provided at the output 64b of the estimated channel impulse response circuit 64. The signal processing portion 60 further includes a functional block f(x) 66, which includes a first input 66a, a second input 66b and an output 66c. The first input 66a of the functional block f(x) 66 is coupled to the output 64b of the estimated channel impulse response circuit 64. The second input 66b of the functional block f(x) 66 is coupled to an output 62b of the modulation circuit 62. The output 66c of the functional block f(x) 66 is coupled to a second input 68b of a subtraction circuit 68, which will be described in detail below. The plurality of estimated parameter or coefficient values $\hat{S}_2(n)$, which are provided to the input 66a of the functional block f(x) 66, cooperate with one or more predetermined functions defined on the functional block f(x) 66 to provide an output representing nonlinear component user information values $\hat{S}_2(n)'$, which is described in detail below.

In one embodiment, the estimated channel impulse response circuit 64 operates to generate the estimated parameter or coefficient values of the nonlinear function of f(x), which is used in conjunction with the signal $y_2(n)'$ provided by the IFFF to generate the signal $\hat{S}_2(n)'$. In the exemplary embodiment, the RappPa model can be approximated by the polynomial model if the parameter of p of the RappPa model is larger than 2. In this instance, the channel estimation can be performed using the LMS method and the training sequence. Further in the exemplary embodiment, the predetermined function of the functional block f(x) 66 includes the RappPa model function, which receives and cooperates with the estimated data from the output 62b of modulation circuit 62 to provide the output representing nonlinear component user information values $\hat{S}_2(n)'$, as described above.

The first subtraction circuit 68 included on the signal processing portion 50 is adapted to receive the nonlinear component user information values $\hat{S}_2(n)'$ at the second input 68b thereof and the multiple user information values y(n) at a first input 68a of the subtraction circuit 68. The subtraction circuit 68 is adapted to subtract the nonlinear component user information values $\hat{S}_2(n)'$ from the multiple user information values y(n) to output a second set of user information values $\approx y(n)$, at an output 68c of the subtraction circuit 68. The second set of user information values can be associated with a first user of the wideband radio receiver 30.

It should be appreciated that the second set of user information values $\approx y(n)$, which may be associated with the first user (e.g. user 1), includes significantly reduced ACI with respect to user information values associated with the second user of the wideband radio receiver. In the exemplary embodiment, the dominate ACI is generated by the in-band signal associated with the second user (e.g. user 2), which may undesirably affect the in-band signal associated with the first user (e.g. non-linear channel effects). However, after compensating for the non-linear channel effects induced on the first user by the second user, as described above, by subtracting the nonlinear component user information values $\hat{S}_2(n)'$ from the multiple user information values y(n), the second set of user information values y(n) provided from the subtraction circuit realizes significantly reduced ACI effects on the first user. In this manner, the affect of ACI, which is generated by the second user and induced on to the first user, is reduced or minimized.

The second channel 70 of the wideband radio receiver 30 includes a second filter 72 having an input 72a adapted to receive and process the second set of user information values $\approx y(n)$, which was previously generated by the subtraction circuit 68 located on the signal processing portion 60, to generate a filtered second set of user information values (or at least one user information value) $y_1(n)$. The second channel 70 further includes a demodulation circuit 74, which is coupled to an output 72b of the second filter 72. The demodulation circuit 74 is adapted to receive and process the filtered second set of user information values $y_1(n)$ to provide a spectral representation of the filtered second set of user information values $I_1(n)$ at an output of the modulation circuit 74. The output 74b of the demodulation circuit 74 defines an output of the second channel portion 70.

Although the exemplary embodiment of the wideband radio receiver 30 described above includes the first and second users thereof, it should be understood that the wideband radio receiver of the present invention is fully scaleable to include a plurality of users by providing additional channels, such as channels 70' and 70", as would be evident to those skilled in the art.

Figure 4:
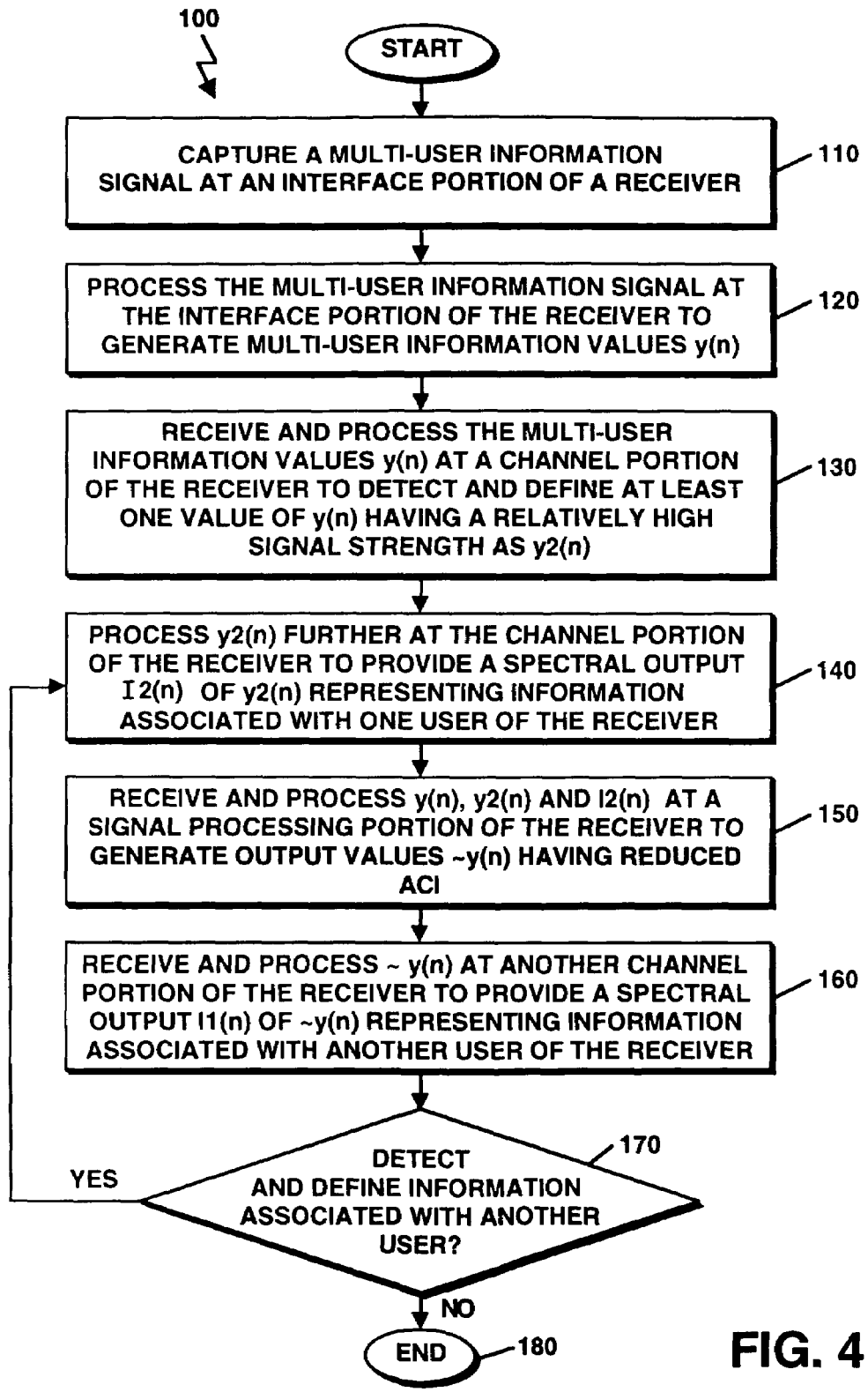
FIG. 4 is a flow chart illustrating a process for combatting non-linear distortion of FIG. 3.

Referring now to FIG. 4, a method 100 for combating non-linear distortion is set forth in accordance with the present invention. The method includes capturing a multi-user information signal at an interface portion 40 of a receiver 30, at step 110. At step 120, the multi-user information signal may be processed at the interface portion 40 of the receiver 30 to generate a plurality of multi-user information values y(n). The multi-user information values y(n) can be provided to a first channel portion 50 of the receiver 30. At step 130, the first channel portion 50 of the receiver 30 receives and processes the multi-user information values y(n) to detect and define at least one value of y(n), which includes a relatively high signal strength, as $y_2(n)$. At step 140, the relatively high signal strength value $y_2(n)$ (e.g. in-band user with greatest signal amplitude) may be further processed at the first channel portion 50 of the receiver 30 to provide a spectral output $I_2(n)$ of $y_2(n)$. The spectral output $I_2(n)$ may represent information associated with one user (e.g. user 2) of the receiver 30.

At step 150, the method further includes receiving and processing the multi-user information values y(n), the relatively high signal strength $y_2(n)$ and the spectral output $I_2(n)$ to generate one or more output values defined as a second set of user information values ≈y(n) having reduced ACI. At step 160, the second set of user information values ≈y(n) can be received and processed at another channel portion 70 of the receiver 30 to provide a spectral output $I_1(n)$ of the second set of user information values ≈y(n), which represents information associated with another user (e.g. user-1) of the receiver 30.

It should be understood that the above-described method is scalable to be executed on a plurality of additional channels, such as channels 70' and 70", which are used by a plurality of users of the receiver. Thus at step 170, the method 100 further includes electing whether to detect and define information associated with other users of the receiver 30, such as users associated with the second channel 70 or the plurality of additional channels 70' and 70". If an election is made to detect and define information associated with other users of the receiver 30, the above described steps 130–160 can be repeated. If an election is made not to detect and define information associated with other users of the receiver 30, the method 100 ends at step 180.

Figure 5:
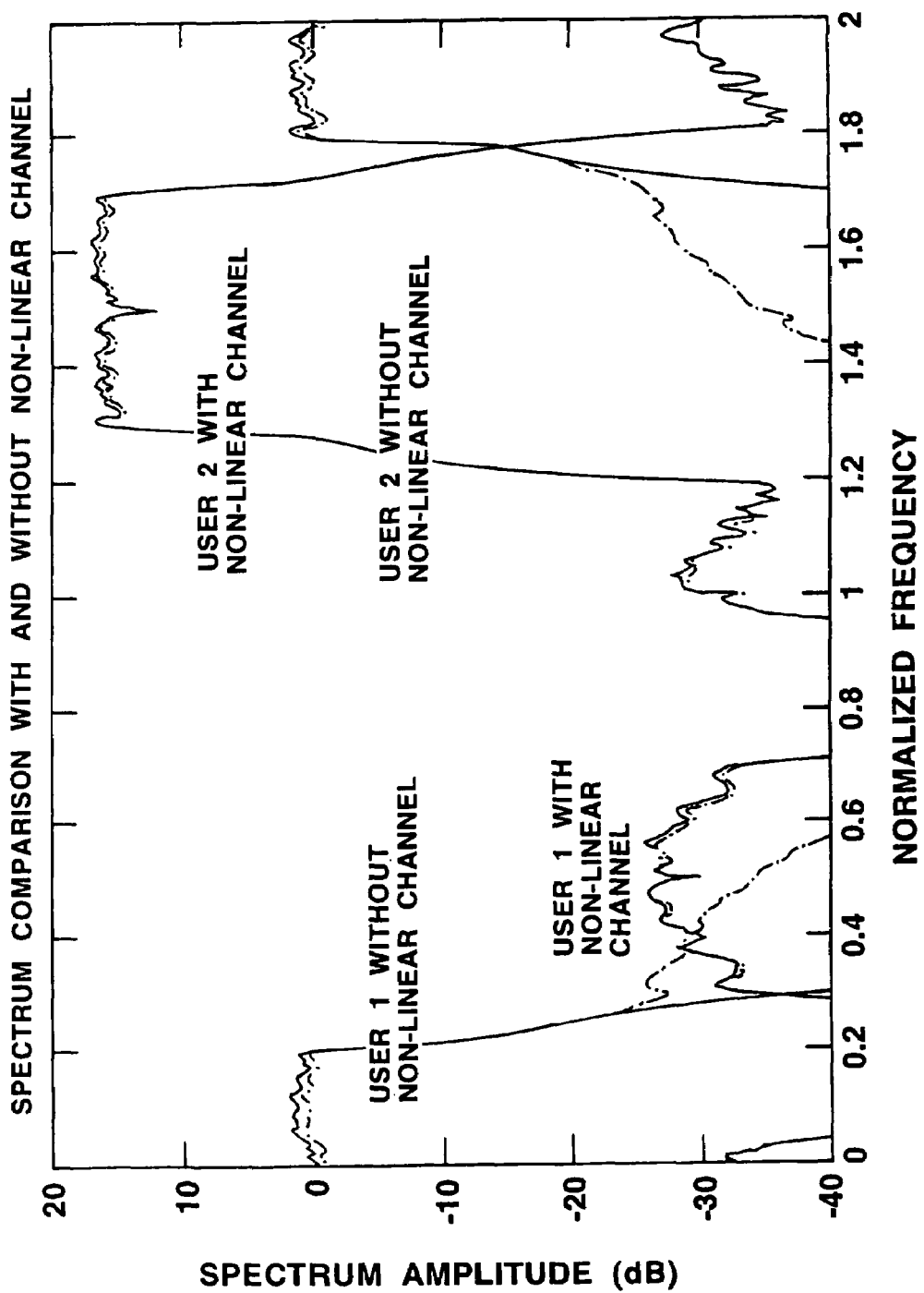
FIG. 5 is a plot of the cancellation of side-lobe of user 2 using the technique of the present invention.

Referring now to FIG. 5, one of the simulation results is shown. It should be understood from inspection of FIG. 5 that the proposed system 30 and method 100 significantly reduce the ACI of at least user 2. The simulation result of FIG. 5 also indicates that the proposed invention can enhance the system performance and increase the spectrum efficiency. The power imbalance environment is improved by 14 to 8 dB for QPSK and QAM-64 respectively in the OFDM system. It is noted that the signal construction processing can be done in both time and frequency domain, which generally depends on the modulation schemes used in the system.

What is claimed is:

1. A multi-user wideband radio receiver, comprising:
an interface adapted to receive and process a multi-user information signal to provide a plurality of multi-user information values having a plurality of predetermined content associated with a plurality of users of the multi-user wideband radio receiver;
a first channel of a plurality of channels being adapted to receive and process the plurality of multi-user information values to detect at least a first information value having a relatively high signal strength, the first information value having first predetermined content of the plurality of predetermined content and being associated with a first user of the plurality of users of the multi-channel wideband radio receiver;
a signal processing portion adapted to receive and process the plurality of multi-user information values, the first information value and a spectral representation of the first information value to generate a plurality of second information values, the signal processing portion including an estimated channel impulse response module to receive the first information value and a reconstruction of the spectral representation of the first information value to generate the plurality of second information values,
wherein the plurality of second information values include significantly reduced adjacent channel interference with respect to the first information value.

2. The multi-channel wideband radio receiver of claim 1, wherein the interface includes an antenna adapted to capture an information signal.

3. The multi-channel wideband radio receiver of claim 2, wherein the interface further includes an amplifier having an input coupled to receive the information signal from the antenna and an output adapted to provide an amplified version of the information signal.

4. The multi-channel wideband radio receiver of claim 3, wherein the interface further includes a converter circuit having a first input coupled to receive the amplified version of the information signal from the amplifier and a second input adapted to receive a reference signal, whereby the converter circuit processes the amplified version of the information signal and the reference signal to provide an intermediate frequency signal at an output of the converter circuit.

5. The multi-channel wideband radio receiver of claim 4, wherein the interface further includes an analog-to-digital converter (ADC) having an input coupled to the output of the converter circuit and an output coupled to the first channel portion and to the signal processing portion, the output of the ADC being adapted to provide the plurality of multi-user information values.

6. The multi-channel wideband radio receiver of claim 5, wherein the first channel includes a first filter having an input coupled to the output of the ADC and an output adapted to provide at least the first information value having the relatively high signal strength.

7. The multi-channel wideband radio receiver of claim 6, wherein the first channel further includes a demodulation circuit having an input coupled to the output of the first filter and an output adapted to provide the spectral representation of the first information value.

8. The multi-channel wideband radio receiver of claim 7, wherein the demodulation circuit includes a Fast Fourier Transform (FFT) algorithm.

9. The multi-channel wideband radio receiver of claim 1, wherein the signal processing portion includes a modulation circuit having an input adapted to receive the spectral representation of the first information value and an output to provide a reconstructed version of the first information value.

10. A multi-user wideband radio receiver, comprising:
an interface adapted to receive and process a multi-user information signal to provide a plurality of multi-user information values having a plurality of predetermined content associated with a plurality of users of the multi-user wideband radio receiver;
a first channel of a plurality of channels being adapted to receive and process the plurality of multi-user information values to detect at least a first information value having a relatively high signal strength, the first information value having first predetermined content of the plurality of predetermined content and being associated with a first user of the plurality of users of the multi-channel wideband radio receiver; and
a signal processing portion adapted to receive and process the plurality of multi-user information values, the first information value and a spectral representation of the first information value to generate a plurality of second information values, wherein the plurality of second information values include significantly reduced adjacent channel interference with respect to the first information value,
wherein the signal processing portion includes a modulation circuit having an input adapted to receive the spectral representation of the first information value and an output to provide a reconstructed version of the first information value,
wherein the signal processing portion further includes an estimated channel impulse response circuit having an input coupled to receive the first information value having the relatively high signal strength and an output to provide a plurality of estimated coefficient values.

11. The multi-channel wideband radio receiver of claim 10, wherein the signal processing portion further includes a functional block circuit having a first input coupled to the output of the estimated channel impulse response circuit to receive the plurality of estimated coefficient values.

12. The multi-channel wideband radio receiver of claim 11, wherein the functional block circuit further includes a second input coupled to the output of the modulation circuit to receive the reconstructed version of the first information value, whereby the functional block circuit processes the plurality of estimated coefficient values and the reconstructed version of the first information value to provide nonlinear component user information values at an output of the functional block circuit.

13. The multi-channel wideband radio receiver of claim 12, wherein the signal processing portion further includes a subtraction circuit having a first input adapted to receive the plurality of multi-user information values and a second input adapted to receive the nonlinear component user information values, whereby the subtraction circuit is operative to subtract the nonlinear component user information values from the plurality of multi-user information values to provide the plurality of second information values at an output of the subtraction circuit.

14. The multi-channel wideband radio receiver of claim 1, further including a second channel of the plurality of channels and being adapted to receive and process the plurality of second information values to provide at least a second information value having second predetermined content of the plurality of predetermined content and being associated with a second user of the plurality of users of the multi-channel wideband radio receiver.

15. The multi-channel wideband radio receiver of claim 14, wherein the second channel includes a filter having an input coupled to the output of the subtraction circuit to receive the plurality of second information values and an output adapted to provide the second information value.

16. The multi-channel wideband radio receiver of claim 15, wherein the second channel further includes a demodulation circuit having an input coupled to the output of the filter to receive the second information value and an output to provide a spectral representation of the second information value.

17. A communication system, comprising:
an antenna to receive a multi-user information signal;
an amplifier coupled to the antenna to amplify the received signal;
an analog to digital converter (ADC) to digitize the amplified signal;
a first channel portion including
a filter coupled to the ADC to output a first set of user information values; and
a demodulator coupled to an output of the filter;
a signal processing module coupled to the first channel portion, the signal processing module including,
a modulator coupled to an output of the demodulator to reconstruct the first set of information values; and
an estimated channel response module coupled to the filter output to generate estimated coefficient values; and
a functional block to receive the reconstructed first set of information values and the estimated coefficient values and generate nonlinear component user information values.

18. The system according to claim 17, further including using a RappaPa model to generate the nonlinear component user information values.

19. The system according to claim 17, further including a summer device to receive the nonlinear component user information values and the first set of user information values to generate a second set of user information values.

* * * * *